United States Patent [19]

Ho et al.

[11] 3,820,086

[45] June 25, 1974

[54] READ ONLY MEMORY (ROM) SUPERIMPOSED ON READ/WRITE MEMORY (RAM)

[75] Inventors: Irving T. Ho, Poughkeepsie; Gerald A. Maley, Fishkill, both of N.Y.

[73] Assignee: International Business Machines Corporation, Armonk, N.Y.

[22] Filed: May 1, 1972

[21] Appl. No.: 249,076

[52] U.S. Cl. ........... 340/173 FF, 307/238, 307/291, 340/173 SP

[51] Int. Cl.. G11c 11/40, G11c 17/00, H03k 3/286

[58] Field of Search.... 340/173 R, 173 SP, 173 CA, 340/173 FF; 307/238, 291

[56] References Cited

UNITED STATES PATENTS

| | | | |
|---|---|---|---|
| 3,618,052 | 11/1971 | Kwei | 340/173 FF |
| 3,654,499 | 4/1972 | Smith | 340/173 CA |
| 3,662,351 | 5/1972 | Ho | 340/173 FF |

OTHER PUBLICATIONS

Platt, Nonsymmetrical Memory Cell, 3/72, IBM Technical Disclosure Bulletin, Vol. 14, No. 10, p. 2,883.

*Primary Examiner*—Stuart N. Hecker
*Attorney, Agent, or Firm*—Theodore E. Galanthay

[57] ABSTRACT

The disclosures describes a transistor storage cell operable both as a random access read/write memory cell or as a read only memory cell. The memory cell structure includes a bistable circuit adapted to be set into one of two stable conditions and an imbalancing means for providing structural asymmetry. The memory cell is operable either as a read/write cell or, by accessing the cell through the imbalancing means, the latent image provided by the structural asymmetry of the cell is read out without affecting the information contained in the cell from the read/write mode of operation.

21 Claims, 5 Drawing Figures

READ ONLY MEMORY (ROM) SUPERIMPOSED ON READ/WRITE MEMORY (RAM)

CROSS REFERENCE TO RELATED APPLICATION

U.S. Pat. application Ser. No. 023,609, filed in the U.S. on Mar. 30, 1970, now U.S. Pat. No. 3,662,351 issued on May 9, 1972 and assigned to the assignee of the present application.

BACKGROUND OF THE INVENTION 1. Field of the Invention

This invention relates to a read only memory superimposed on a read/write memory, and more particularly to a storage cell adapted to simultaneously read out the read/write information in a non-destructive manner together with the latent image contained in the read only memory.

2. Description of the Prior Art

In the prior art, it is well known to construct an information storage system from bistable circuit elements such as transistor flip-flops. Numerous such bistable storage elements are arranged in rows and columns and accessed for purposes of reading and writing information by means of word and bit lines. An example of one such electronic memory is found in U.S. Pat. No. 3,541,530.

Read only memories (ROM) are equally well known. A read only memory is characterized by having certain preset information that may be read out in a non-destructive manner. A read only memory will continue to provide the same information until such time as the preset conditions are altered.

It is apparent that if a memory could be constructed with cells capable of read/write operation, and these same cells containing a latent image, providing read only memory operation, added flexibility would be combined with savings in cost. Such a latent image memory is disclosed in the above mentioned U.S. Pat. No. 3,662,351. Such prior latent image memories usually had the characteristic of being operable in only one of two modes at any one time. Specifically, it was usually necessary to destroy the information normally contained in the read/write function of the cell in order to be able to operate the cell in the read only mode.

SUMMARY OF THE INVENTION

Accordingly, it is a primary object of this invention to provide an improved bistable memory cell operable either in a read/write or a read/only mode.

Another object of this invention is to provide a memory cell which is operable in the read/only mode without disturbing the information inserted in the same cell in the read/write mode.

It is a further object of the invention to provide a memory cell capable of simultaneously reading out both the information contained in the cell by virtue of its read/write as well as its read/only mode of operation.

In accordance with the present invention, a bistable transistor circuit is provided with means for setting this bistable circuit into one of two stable conditions. Such bistable circuits are well known in the art, many of them taking the form of bistable multi-vibrators and commonly referred to as flip-flops. A plurality of such cells are normally interconnected into matrices and arrays, each cell being uniquely accessible by means of a word line and bit/sense lines for purposes of writing information into and reading information out of said cell. In accordance with the present invention, an imbalancing means is electrically coupled to one of the two halves of the bistable cell thereby causing a structural asymmetry. Such an imbalancing means can take the form of a diode connected to one of two sides of a flip-flop. Such a diode can further take the form of a Schottky barrier diode as well as a conventional diffused diode formed directly into the collector region of one of the two transistors forming the flip-flop. Such a diode may further be electrically connected to the P+ isolation wall of the integrated transistor and if the isolation wall protrudes to the substrate, then the diode can be electrically accessed by pulsing the substrate. In a standard configuration, however, all the diodes in a row are connected to a word line, such a word line being in addition to the conventional word line used to access the bistable cell. The latent image of a zero or a one is then determined by the side of the flip-flop to which the diode is connected.

When operating in the read only mode, the imbalancing means causing the structural asymmetry is electrically accessed within the same time interval during which the read/write information is accessed for a read cycle. If the same information is contained both in the read/write mode and the read/only mode (i.e., both are a binary zero or both are a binary one), then the resulting waveform delivered to the sense amplifier is the same as if the latent image had not even been accessed. In other words, a "1" or a "0" is read from the cell and if it is known that the latent image was accessed, then it is known that is the information contained in the read/only mode. If, on the other hand, the information is dissimilar, then the waveform received at the sense amplifier will be different and thus provide a detectable dissimilarity. More specifically, the information contained in the read/only mode is superimposed over the information contained in the read/write mode such that both sets of information become available during the same read cycle.

DESCRIPTION OF THE DRAWINGS

The foregoing and other objects, features, and advantages of this invention will be apparent from the following more particular description of the preferred embodiments of the invention as illustrated in the accompanying drawings in which.

DESCRIPTION OF THE PREFERRED EMBODIMENT

Figure 1:
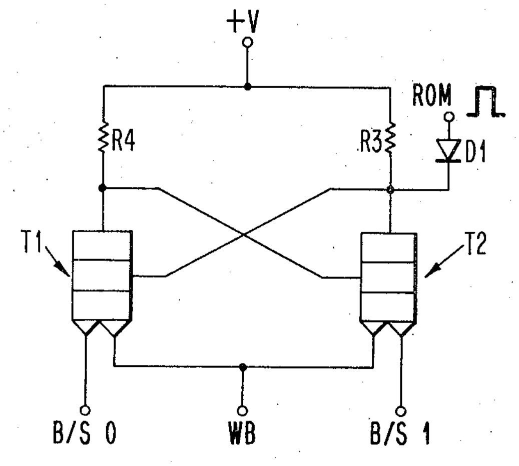
FIG. 1 is a bistable memory cell incorporating the structural asymmetry of the present invention.

Referring now to FIG. 1, there is shown a bistable transistor cell comprising cross-coupled transistors T1 and T2. Each of these transistors have two emitters that are fabricated in accordance with monolithic integrated circuit technology. Resistor R3 is a load resistance connected between the collector of T1 and a source of potential +V. Resistor R4 is the load resistor for T2 and is connected between the collector of T2 and the source of potential +V. The inner emitters of each of the transistors are connected together and are further adapted to be connected to the word line (WB) of a row of bistable cells. The outer emitter of T1 is connectable to a bit/sense "one" line (B/S1) while the outer emitter of T2 is connectable to a bit/sense "zero" line (B/S0). The latent image for the read only memory (ROM) feature is provided by diode D1 connected to the collector of transistor T1. Diode D1 can be either a conventional diode or a Schottky barrier diode. In integrated form, a Schottky barrier diode can be directly formed in the collector region of T1 without costing additional semiconductor area. The outer terminal of diode D1 is connectable to a word line (ROM) where either a whole row or all of such diodes in the whole array would be electrically accessed simultaneously. The FIG. 1 cell is embodied in NPN bipolar transistors so that the potential +V would typically be approximately 2 to 3 volts. In order to operate this cell in the read/only mode, a positive pulse must be applied to the ROM terminal as shown. Also, it should be noted that the +V need not be a steady state voltage but can be a bilevel pulse powered source. All the operations described herein, however, occur when such a bilevel powered source would be in a high, activated state.

Figure 2:
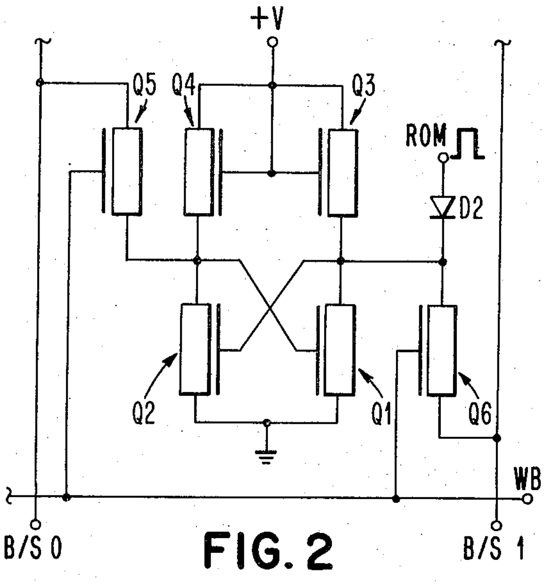
FIG. 2 is a circuit diagram of another bistable cell incorporating the structural asymmetry of the present invention.

Refer now to FIG. 2 which shows the present invention embodied in field effect transistor (FET) technology. Corresponding features have been labelled with corresponding reference numerals insofar as deemed practical. Also, N channel FET devices are illustrated in order to maintain consistency with the FIG. 1 illustration. It is well known by those skilled in the art, that PNP transistors or P channel field effect transistors would provide the same result as described herein except that the potential supplied would have to be a –V, the illustrated diode(s) may then be reversed, and the accessing pulse for the ROM feature would be a negative going pulse. Any diode direction and polarity combination can be worked out so long as no current flows in the diode when the ROM is not accessed. In FIG. 2 there is illustrated a bistable FET cell consisting of cross-coupled FETs Q1 and Q2. FETs Q3 and Q4 form the load resistors for FETs Q1 and Q2, respectively. FETs Q5 and Q6 connected to the drain terminals of Q2 and Q1, respectively, are used to access the cell. The gate of Q5 as well as the gate of Q6 is connected to the word line WB. The drain of Q5 is connected to the bit/sense "zero" line B/S0 while the drain of Q6 is connected to the bit/sense "one" B/S1 line. Note that since FETs are bilateral devices, the terminology of drain and source are interchangeable. The source of Q1 and the source of Q2 are both connected to ground. Diode D2 is connected to the drain of Q1 for structurally imbalancing the cells in order to obtain the read/only function. As previously described, D2 may be a conventional diode or a Schottky diode formed in the same chip with the rest of the transistors forming the cell. It should be noted that the space such a diode would occupy in the cell is minimal. The outer end of diode D2 is connected to a word line labelled ROM which is pulsed positively when the read/only function is desired. The amplitude of the positive going pulse is limited such that the cathode side of the diode will not rise higher than the threshold voltage of either the Q1 or Q2 FET device. The potential source +V for the particular field effect transistors shown is typically 10 volts.

Figure 5:
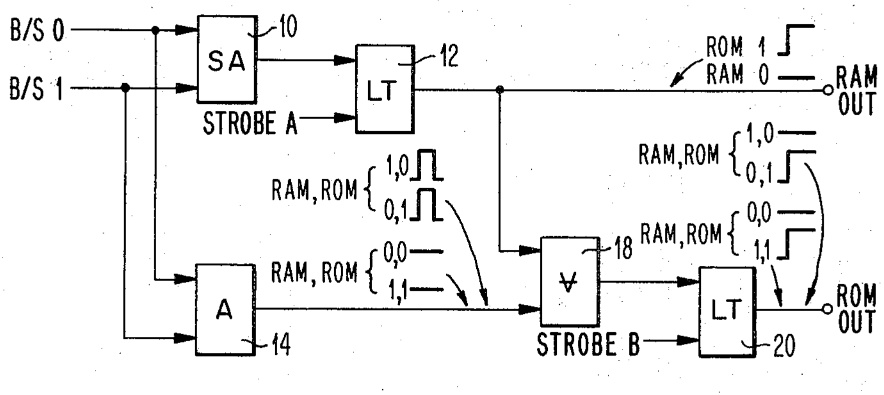
FIG. 5 is a schematic block diagram representing one logical technique for simultaneously sensing the RAM and ROM information in a particular memory cell.

Refer now to FIG. 5 for a logical representation of a scheme for simultaneously sensing both the read/write and read/only information. During the read cycle, both the B/S0 and B/S1 lines are connected to the differential sense amplifier 10. The output of sense amplifier 10 is strobed into automatically resetting latch 12. The output of latch 12 represents the read/write information contained in the bistable cell, which is the output of the random access memory (RAM). One technique of simultaneously sensing the read/only information in the cell is to connect the inputs of AND circuit 14 to the bit/sense "zero" and bit/sense "one" lines. The output of AND circuit 14 is applied to the input of exclusive OR circuit 18. The other input of exclusive OR circuit 18 is the output of latch 12. The output of exclusive OR circuit 18 is strobed into automatically resetting latch 20 which provides the read/only information contained in the cell providing the read only memory (ROM) output.

OPERATION

Figure 3:
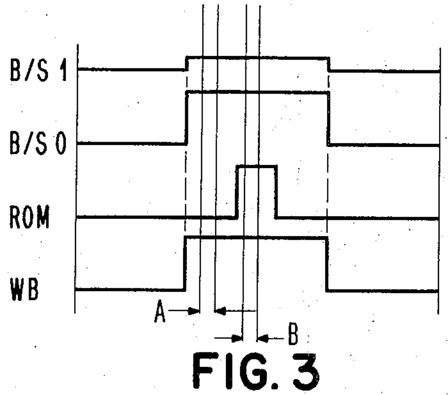
FIG. 3 is a waveform diagram illustrating the operation of the memory cell of FIG. 1.

Refer now to FIG. 3 which shows the operation of the circuit of FIG. 1 when both the RAM and ROM information are a binary zero. It has been assumed that the connection of D1 to the collector of T1 results in a ROM zero. In the alternative, it is understood that if D1 were connected to the collector of T2, this would result in the ROM being equal to a binary one. During the conventional read/write operation of the RAM, the anode of D1 is biased negatively and will have absolutely no effect on the operation of the cell. When the system requires the latent image contained in the ROM, the word line WB is brought up as in the ordinary read/write operation. A positive pulse is also applied at the anode of D1. In order that this positive pulse not disturb the read/write information and yet be large enough to reveal the latent image, it should approximately be equal to:

$$VBE + \frac{1}{2}[VCO + VCl]$$

Where VCO is the collector voltage of the transistor that is "on," VCl is the collector voltage of the transistor that is "off" and VBE depends on the type of diode used. If diode D1 is a PN junction diode, then VBE will be approximately .75 volts while if D1 is a Schottky barrier diode, then VBE will be approximately 0.4 volts. Assuming a nominal value of VCO of approximately 0.92 volts and VCl of approximately 1.65 volts, the potential applied to the anode of D1 will be either 2 volts or 1.7 volts depending on whether conventional or Schottky barrier diodes are used, respectively. A schottky barrier diode SBD is preferred over PN junction diodes because it requires less chip area while PN junction diodes may contribute to some parasitic PNP transistor effect.

Continuing with the present example where both the RAM and ROM signals are storing a binary "0," then a positive pulse of 1.7 volts at the ROM terminal has no effect on the cell since the drop across the diode is only 0.05 volts. (The difference between 1.7 volts and 1.65 volts.) As illustrated in FIG. 3, when the word line WB is brought positive, it causes the conducting one of the two transistors T1 and T2 to carry current in the outer emitter path. Since in the assumed example, T2 was ON, the B/S0 line is brought to an up level with slight leakage current likely on line B/S1. The appearance of the pulse on the ROM line has no effect on the sense output as was just explained in great detail.

Those skilled in the art will recognize that if, in the alternative, D1 is connected to the collector of T2 and a condition is assumed that T1 is conducting, then both the RAM and ROM would store binary ones. In such a configuration, the identical waveform as shown in FIG. 3 would prevail with the interchanging of the B/S1 and B/S0 waveforms in order to indicate that a binary one was stored.

Referring again to the comparator circuit of FIG. 5, it is clearly seen that the output of sense amp 10 strobed into latch 12 during time A (by a strobe pulse during time A) will provide the RAM output. If the ROM output is desired, it is necessary to also examine the waveforms B/S0 and B/S1 during time B when the ROM pulse is up. Looking at the waveform of FIG. 3, neither of the bit lines is changing state during time B. Therefore the output of AND circuit 14 will not change state. Since in the present example of both the RAM and ROM modes storing the same information, there is no transition in the bit lines, the output of AND circuit 14 to exclusive OR 18 will be at a down level, i.e., "zero." Therefore, the output of exclusive OR 18 will be the same as the output of latch 12 and this signal will be strobed into latch 20 during time B, latch 20 providing the ROM output which in this case will be identical to the RAM output. The waveforms resulting from the possible logical combinations are shown in FIG. 5.

Figure 4:
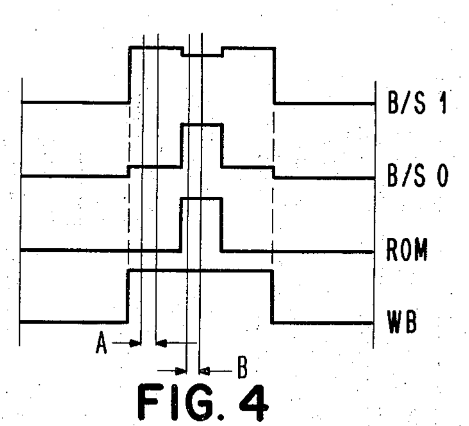
FIG. 4 is a waveform diagram also illustrating the operation of the circuit of FIG. 1.

In the event that the information stored in the RAM and ROM modes are dissimilar, the waveforms of FIG. 4 will result. FIG. 4 specifically shows the condition when a binary one is stored in the RAM mode (T1 conducting) and a zero is stored in the ROM mode (diode D1 connected as shown in FIG. 1). When the word line is raised, T1 conducts current through its outer emitter raising the B/S1 line. During time A, this is detected at the output of the read/write (RAM) mode. Note that time A includes any time from when the WB line is first brought up and the ROM line is brought up. When the ROM line is brought up, during time B, the B/S0 and B/S1 waveforms are varied as shown. Referring to FIG. 1, the ROM pulse of 1.7 volts forces the 0.92 volts at the collector of T1 to be raised to 1.3 volts, allowing for the 0.4 volt drop across the Schottky barrier diode. The B/S0 line will raise from a quiescent noise level of 0.2 volts to approximately 0.5 volts while there is some decrease in the output voltage of the B/S1 line. This positive going transition can be sensed by the comparator circuit of FIG. 5. Specifically, AND circuit 14 will provide a positive input pulse to exclusive OR circuit 18 causing the output of exclusive OR circuit 18 to be opposite that of the output of latch 12. During time B, therefore, a signal opposite to that of the RAM output is strobed into latch 20 causing the ROM output to be opposite that of the RAM output. It is important to understand that the waveform configurations shown can be sensed by many different means other than the comparator schematic of FIG. 5. For example, threshold detectors could be triggered to detect an amplitude difference between the B/S0 and B/S1 waveform during the occurrence of the ROM input pulse. Once it has been learned that a detectable waveform difference is obtained by the structural asymmetry configuration and mode of operation of the present invention, numerous sensing techniques will suggest themselves to those skilled in the art. It should also be noted that the circuit of FIG. 2 will operate in a manner similar to the circuit of FIG. 1 except that the voltage values will be proportionally increased for the higher potential values required for presently known integrated FET circuit structures. What has then been described is a memory cell simultaneously operable as both a read/write and a read/only memory without disturbing the read/write information when the read only memory (ROM) is accessed. The imbalance resulting from the structural asymmetry introduced by a diode is but one of a number of ways this invention can be realized.

While the invention has been particularly shown and described with reference to preferred embodiments, it will be understood by those skilled in the art that the foregoing and other changes in form and in detail may be made therein without departing from the spirit and scope of the invention.

What is claimed is:

1. An information storage apparatus operable both as a read/write memory and as a read only memory comprising:
   - at least one information storage cell adapted to be set into more than one condition representing writable stored information;
   - means electrically coupled to said information storage cell for setting said information storage cell into one of said at least more than one conditions;
   - imbalancing means electrically coupled to said information storage cell for selectively introducing structural asymmetry into said information storage cell; and
   - means for sensing the readable only stored information without changing the said one of said at least more than one conditions representing writable stored information.

2. A read/write memory cell operable as a read only memory without disturbing the read/write information contained therein comprising:
   - a bistable circuit adapted to be set into one of two stable conditions representing writable stored information;
   - means electrically coupled to said bistable circuit for setting said bistable circuit into one of its two stable conditions;
   - imbalancing means integral with said bistable circuit for selectively introducing structural asymmetry into said circuit and representing readable only stored information; and
   - means for sensing the readable only stored information without changing the said one of two stable conditions representing the writable stored information.

3. Apparatus as in claim 2 wherein the imbalancing means is connected to a word line.

4. Apparatus as in claim 2
   - in which said means for sensing the readable only stored information without changing the writable stored information includes means for sensing the writable stored information.

5. Apparatus as in claim 2 where the imbalancing means is a diode.

6. Apparatus as in claim 5 where the diode is a Schottky barrier diode.

7. Apparatus as in claim 2 wherein said read/write memory cell is constructed in accordance with integrated circuit technology.

8. Apparatus as in claim 7 wherein said imbalancing means is connected to the substrate of said integrated circuit.

9. Apparatus as in claim 7 in which said bistable circuit adapted to be set into one of two stable conditions is connected to a bilevel power source.

10. A read/write memory cell operable as a read only memory without disturbing the read/write information contained therein comprising:

a bistable circuit adapted to set into one of two stable conditions representing writable stored information;

means electrically coupled to said bistable circuit for setting said bistable circuit into one of its two stable conditions;

imbalancing means electrically coupled to said bistable circuit for selectively introducing structural asymmetry into said bistable circuit and representing readable only stored information; and means for sensing the readable only stored information without changing tbe said one of two stable conditions representing the writable stored information.

11. Apparatus as in claim 10 in which the imbalancing means is connected to a word line.

12. Apparatus as in claim 10 in which the imbalancing means is a diode.

13. Apparatus as in claim 12 in which the imbalancing means is a Schottky barrier diode.

14. Apparatus as in claim 10 in which the read/write memory cell is constructed as an integrated circuit.

15. Apparatus as in claim 14 wherein said imbalancing means is connected to a substrate.

16. Apparatus as in claim 14 in which the bistable circuit adapted to be set into one of two stable conditions is connected to a bilevel power source.

17. Apparatus as in claim 10 in which said means for sensing the readable only stored information without changing the writable stored information includes means for sensing the writable stored information.

18. Apparatus as in claim 17 in which both the readable only stored information and the writable stored information are sensed simultaneously.

19. Apparatus as in claim 17 in which said sensing means compares for a dissimilarity between the condition of said bistable circuit and the latent image caused by said imbalancing means.

20. Apparatus as in claim 17 in which both the readable only stored information and the writable stored information are sensed simultaneously.

21. Apparatus as in claim 20 in which said sensing means compares for a dissimilarity between the condition of said bistable circuit and the latent image caused by said imbalancing means.

* * * * *